US009190921B2

(12) United States Patent
Mertens et al.

(10) Patent No.: US 9,190,921 B2
(45) Date of Patent: Nov. 17, 2015

(54) TRANSFORMERLESS CYCLOCONVERTER

(75) Inventors: Axel Mertens, Wedemark (DE);
Lennart Baruschka, Wedemark (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 458 days.

(21) Appl. No.: 13/637,685

(22) PCT Filed: Mar. 30, 2011

(86) PCT No.: PCT/EP2011/001591
§ 371 (c)(1),
(2), (4) Date: Nov. 30, 2012

(87) PCT Pub. No.: WO2011/120679
PCT Pub. Date: Oct. 6, 2011

(65) Prior Publication Data
US 2013/0069439 A1    Mar. 21, 2013

(30) Foreign Application Priority Data
Apr. 1, 2010  (DE) .......................... 10 2010 013 862

(51) Int. Cl.
*H02J 1/00*       (2006.01)
*H02J 3/00*       (2006.01)
*H02M 5/293*      (2006.01)
*H02M 5/297*      (2006.01)
*H02M 7/483*      (2007.01)

(52) U.S. Cl.
CPC .............. *H02M 5/293* (2013.01); *H02M 5/297* (2013.01); *H02M 2007/4835* (2013.01); *Y10T 307/707* (2015.04)

(58) Field of Classification Search
CPC .............................. H02M 5/293; H02M 5/297
USPC ................... 307/18, 29, 82; 363/17, 65, 71
See application file for complete search history.

(56) References Cited

U.S. PATENT DOCUMENTS 5,642,275  A      6/1997  Peng et al.
7,330,363  B2 *   2/2008  Ponnaluri et al. ............... 363/71
(Continued)

OTHER PUBLICATIONS

Glinka et al., "A New AC/AC-Multilevel Converter Family Applied to a Single-Phase Converter", Power Electronics and Drive Systems, Nov. 17, 2003, pp. 16-23, vol. 1, IEEE, Piscataway, NJ.
(Continued)

*Primary Examiner* — Rexford Barnie
*Assistant Examiner* — Rasem Mourad
(74) *Attorney, Agent, or Firm* — Henry M. Feiereisen LLC

(57) ABSTRACT

A transformerless cycloconverter for connecting a first three-conductor system to a second three-conductor system by bridge modules with electronic semiconductor switches has precisely six bridge modules or series circuits thereof with a first bridge module or series circuit connected to the first conductors of the first and second systems, a second bridge module or series circuit connected to the second and first conductors of the first and second systems, a third bridge module or series circuit connected to the second conductors of the first and second systems, a fourth bridge module or series circuit connected to the third and second conductors of the first and second systems, a fifth bridge module or series circuit connected to the third conductors of the first and second systems, and a sixth bridge module or series circuit connected to the first and third conductors of the first and second systems.

10 Claims, 4 Drawing Sheets

(56) References Cited

U.S. PATENT DOCUMENTS

| | | | |
|---|---|---|---|
| 2004/0022081 A1* | 2/2004 | Erickson et al. | 363/159 |
| 2007/0008744 A1* | 1/2007 | Heo et al. | 363/17 |
| 2007/0164613 A1* | 7/2007 | Yamada et al. | 307/66 |
| 2008/0055947 A1 | 3/2008 | Wen | |
| 2008/0316778 A1* | 12/2008 | Wagoner | 363/65 |
| 2011/0198936 A1* | 8/2011 | Graovac et al. | 307/82 |

OTHER PUBLICATIONS

Wen; Smedley, "Synthesis of Multilevel Converters Based on Single- and/or Three-phase Converter Building Blocks", Industrial Electronics Society, 2007. IECON 2007. 33rd Annual Conference of the IEEE, Nov. 5-8, 2007, pp. 1780-1786, IEEE, Piscataway, NJ.

* cited by examiner

TRANSFORMERLESS CYCLOCONVERTER

BACKGROUND OF THE INVENTION

The invention relates to the field of electrical energy supply engineering. The invention relates to in particular a transformerless cycloconverter for connecting a first three-conductor system to a second three-conductor system as claimed in claim 1.

Using a transformerless cycloconverter, electrical energy can be transferred between conductor systems which have, for example, different rated voltages or, in the case of AC voltage, different frequencies. This can be implemented by the use of bridge modules having electronic semiconductor switches without expensive and complex transformers. It is already known, for example, to connect the intermediate circuits of two converters to one another (back-to-back configuration), wherein the first converter is connected to a first three-conductor system and the second converter is connected to a second three-conductor system. If a modular converter is used as converter, in total twelve bridge modules or series arrangements thereof are required for this. Likewise, it has already been proposed to connect a first three-conductor system to a second three-conductor system via a matrix-like arrangement of nine bridge modules or series arrangements thereof.

The invention is therefore based on the object of enabling simpler and more cost-effective coupling and direct conversion between two three-conductor systems.

SUMMARY OF THE INVENTION

This object is achieved by a transformerless cycloconverter for connecting a first three-conductor system, in particular a three-phase system, to a second three-conductor system, in particular a three-phase system, by means of bridge modules having electronic semiconductor switches, the cycloconverter having six bridge modules or series circuits thereof, having the following features: a) a first bridge module or a first series circuit of bridge modules is connected firstly to a first conductor of the first power supply system and secondly to a first conductor of the second power supply system, b) a second bridge module or a second series circuit of bridge modules is connected firstly to a second conductor of the first power supply system and secondly to the first conductor of the second power supply system, c) a third bridge module or a third series circuit of bridge modules is connected firstly to the second conductor of the first power supply system and secondly to a second conductor of the second power supply system, d) a fourth bridge module or a fourth series circuit of bridge modules is connected firstly to a third conductor of the first power supply system and secondly to the second conductor of the second power supply system, e) a fifth bridge module or a fifth series circuit of bridge modules is connected firstly to the third conductor of the first power supply system and secondly to a third conductor of the second power supply system, f) a sixth bridge module or a sixth series circuit of bridge modules is connected firstly to the first conductor of the first power supply system and secondly to the third conductor of the second rower supply system. The dependent claims specify advantageous developments of the invention.

The invention enables, in an elegant manner and with little complexity in terms of circuitry, a simple and cost-effective coupling and direct conversion between two three-conductor systems. In this case, a three-conductor system is understood to mean any electrical connection of an electrical or electronic component part via three conductors supplying supply energy, such as an electric-motor drive, an energy supply system or an electrical generator, for example. The coupling of an electric-motor drive to an energy supply system or an electrical generator to an energy supply system is possible, for example, using the cycloconverter according to the invention. The invention naturally also includes coupling of two energy supply systems to one another.

With the topology, a simplified and more cost-effective design can be achieved in comparison with cycloconverters in accordance with the prior art. Therein, as has been mentioned, an arrangement of at least nine bridge modules or series arrangements thereof is required. Owing to the topology comprising six bridge modules or series circuits of bridge modules, a reduction in the hardware complexity by a third given the same functionality is thus possible. When using a correspondingly large number of bridge modules in the series circuit, the need for corresponding input and output filters also disappears completely. Application areas for the proposed topology are, for example, large speed-regulated drives, generators with variable speed and the sector of system coupling with integrated power factor correction.

In accordance with the invention, the cycloconverter can have a series circuit of a plurality of bridge modules. The use of a series circuit of a plurality of bridge modules enables increased flexibility in respect of the adjustment of the output voltage. In addition, the failsafety is increased since a plurality of bridge modules contains a certain degree of redundancy. Thus, for example, in the case of an internal defect in a bridge module in the series circuit, for example in the case of a defect at an intermediate circuit capacitor or a battery, this bridge module can be bridged via the full-bridge circuit. The voltage failure caused by this can be compensated for by the remaining bridge modules in the series circuit by virtue of a respectively increased output voltage being set per bridge module by corresponding control of the electronic semiconductor switches of the bridge modules.

In an advantageous embodiment of the invention, identical DC bridge voltages are used in all bridge modules. Given a correspondingly high number of bridge modules, fine adjustment of the resulting output voltage of a series circuit of such bridge modules is possible.

In an advantageous development of the invention, bridge modules with different DC bridge voltages can be used. As a result, bridge modules with different rated voltages can be used. The term rated voltage describes the maximum permitted DC bridge voltage for the component parts. This permits different voltage ranges with respect to the adjustable output voltages of the individual bridge modules. This results in improved flexibility in terms of the discrete, adjustable voltage values of a series circuit of bridge modules. In comparison with the use of identical DC bridge voltages in all bridge modules, fine adjustment of the resulting output voltage of the series circuit of bridge modules is already possible in the case of a relatively low number of bridge modules.

As a result, the output voltage of the series circuit can be combined by combination of different voltage values of different bridge modules, advantageously in the manner of a successively approximating digital-to-analog converter. For example, the rated voltages from bridge module to bridge module can be increased in each case by a factor of 2, which enables adjustability of the output voltage of the series circuit in accordance with the binary system. In accordance with another example, in each case a plurality of bridge modules are used in which the DC bridge voltages or rated voltages are different than one another, but with small differences. If, for example, 600 V and 800 V are used in a series circuit as DC bridge voltages, the smallest adjustable voltage step is reduced to 800 V−600 V=200 V.

In accordance with an advantageous development of the invention, at least one bridge module has the following features:
a) the bridge module has a first and a second connection for connection to a conductor of the energy supply system or to a connection of a further bridge module,
b) the bridge module has four electronic semiconductor switches in a full-bridge circuit,
c) the first and the second connections of the bridge module are connected to mutually opposite connection points of the full-bridge circuit,
d) the bridge module has a capacitor, which is connected to the further mutually opposite connection points of the full-bridge circuit.

In this case, the full-bridge circuit enables, variably, a large number of adjustable switching states, for example switching a direct connection between the first and second connections of the bridge module (bridging of the bridge module) or charging or discharging the capacitor with the respectively desired polarity which can be selected via the semiconductor switches. By corresponding driving of the semiconductor switches via a control device, which outputs pulse-width-modulated drive signals, for example, relatively finely adjustable charging and discharging of the capacitor is possible.

In accordance with an advantageous development of the invention, at least one bridge module has the following features:
a) the bridge module has a battery,
b) the bridge module has a controllable DC voltage converter, wherein one connection side of said DC voltage converter is connected in parallel with the capacitor, and the battery is connected to the other connection side of said DC voltage converter.

This makes it possible, in an elegant manner and with little complexity in terms of circuitry, to incorporate a battery in the cycloconverter. An interruption-free power supply can be integrated with little complexity with the battery or a plurality of batteries in the case of the use of a plurality of bridge modules. When using the cycloconverter in a power supply system, the provision of a minutes reserve for system stabilization can thus be realized, for example. Buffer-storing of the energy supply is possible by means of the batteries of the bridge modules even for a relatively long period of time, for example during times of decreased energy generation in a wind energy farm, depending on the design of the batteries. In a comparable manner, a solar cell energy supply device can advantageously be coupled to a three-phase system using the mentioned device. Advantageously, buffer-storing of the energy for low-sunlight times or the night can be performed via the batteries.

The battery is advantageously in the form of a rechargeable battery, for example a nickel-metal hydride rechargeable battery, a lead-acid rechargeable battery or a lithium polymer rechargeable battery. It goes without saying that other rechargeable battery technologies can also be used.

Such an embodiment of the bridge module makes it possible to keep the DC bridge voltage of the bridge module generated with the aid of the battery constant independently of the battery voltage, to be precise by corresponding control of the DC voltage converter. As a result, even as the battery voltage decreases, a constant output voltage can be maintained. In this context, a bridge module is understood to mean any three-dimensional and structural arrangement of the mentioned elements, irrespective of whether the elements are combined in one housing, for example, or are arranged in distributed form. For example, the battery can be structurally separated from the remaining elements of the bridge module. In an advantageous development of the invention, the battery is structurally integrated in the bridge module.

A further advantage consists in that the ripple of the power requirement or the current flowing through the bridge module can be decoupled substantially from the battery. A substantially constant current flow through the battery is possible, i.e. the higher-frequency components in the energy supply system can be kept away from the battery. This increases the potential life of the batteries considerably.

Advantageously, a series circuit of bridge modules can be used. As a result, a direct series circuit of a large number of batteries can be avoided. It is then possible to integrate a plurality of batteries via a plurality of the bridge modules, which each have a dedicated battery. This avoids complexity in terms of circuitry for separate balancing or charging/discharging circuits for the batteries and therefore reduces the overall complexity in terms of circuitry.

Advantageously, the battery voltage is selected taking into consideration the DC bridge voltage or the rated voltage of the respective bridge module. Large ratios of the DC voltage converter can thus be avoided and the efficiency can be optimized. In the case of different rated voltages in the bridge modules of a converter, the voltages of the batteries used then also differ from one another.

A further advantage of the invention consists in that disconnection of the bridge module via the full-bridge circuit is possible. Thus, for example in the case of a defective power semiconductor, the disconnection of a bridge module in a series circuit of bridge modules can take place. Despite failure of a bridge module, the desired output voltage of the series circuit can still be kept constant via the remaining bridge modules.

A further advantage of the invention consists in that a bridge module whose battery is defective can still remain in operation. In the meantime, the module with the defective battery cannot provide any energy, but it can be used to increase the voltage across the series circuit of bridge modules during part of the system period and thus helps to reduce the overdimensioning of the rated voltages of the individual bridge modules, which overdimensioning is required for fail-safe operation of the converter.

By virtue of the two mentioned measures, particularly fail-safe interruption-free power supplies or converter systems can be provided.

A further advantage of the invention consists in that, by virtue of the DC voltage converter, different voltage levels of the battery which are set depending on the state of charge can be compensated for. As a result, the bridge module can produce a desired constant output voltage. Thus, even when using the bridge modules in a series circuit, for example in a converter, a constant voltage at the three-conductor system can be maintained. A further advantage consists in that the overdimensioning provided in the case of the known converters with respect to the number of modules or the battery voltage is no longer necessary since, in the event of failure of one bridge module or the battery of the bridge module, the missing voltage can be compensated for by correspondingly increasing the output voltages and possibly the DC bridge voltages of the remaining bridge modules.

Given a corresponding design of the DC voltage converter, it is possible in principle for the device to be constructed even with a relatively low number of bridge modules or batteries in comparison with interruption-free power supplies from the prior art. As a result, particularly cost-effective interruption-free power supplies can be realized.

Depending on the safety and reliability requirements, in an advantageous configuration, the series circuit of the bridge modules can be overdimensioned from the beginning, i.e. a larger number of bridge modules or batteries can be provided than would be necessary per se to achieve the desired output voltage. Therefore, redundant bridge modules are provided. The desired output voltage can be provided by step-down conversion of the DC bridge voltages of the individual bridge modules across the bridge circuits thereof. Since each individual module thus needs to provide less energy, firstly the batteries are protected thereby. In addition, in the event of failure of a relatively large number of bridge modules, the desired output voltage can still be maintained. As a result, the failsafety of the entire device can also be increased further, for example in comparison with pure series circuits of batteries.

In accordance with an advantageous development of the invention, the DC voltage converter is designed to provide an output voltage at the capacitor which can be adjusted, depending on the embodiment and the control of the DC voltage converter, so as to be higher than, lower than or equal to the voltage of the battery. The use of such a controllable DC voltage converter enables a high degree of flexibility when using the bridge module or a plurality of bridge modules and during the control of the output voltage thereof.

The DC voltage converter can be designed as a pure step-up converter (output voltage higher than or equal to the battery voltage), pure step-down converter (output voltage less than or equal to the battery voltage) or as a combined step-up/step-down converter. The use of a step-up converter is advantageous since, firstly, fewer component parts are required for this than for a combined step-up/step-down converter and secondly a lower battery voltage is required, which reduces the potential demand in respect of balancing possibilities.

In accordance with an advantageous development of the invention, the DC voltage converter is a bidirectional DC voltage converter. As a result, not only can the energy for the DC bridge voltage at that output of the DC voltage converter which is connected to the capacitor be provided variably in one direction, but in addition also the battery with a voltage derived from that side of the DC voltage converter which is connected to the capacitor can be charged with a charge voltage suitable for the respective battery state. In addition, a defined discharging of the battery via the bidirectional DC voltage converter is also controllable, for example for the purpose of forming the battery.

In accordance with an advantageous development of the invention, the DC voltage converter has a half-bridge with two electronic semiconductor switches. Advantageously, semiconductor switches of the same type as for the full-bridge circuit can be used. This enables a simple and cost-effective design of the DC voltage converter from few component parts and therefore a cost-effective design of the entire bridge module.

In an advantageous development of the invention, the electronic semiconductor switches are provided in the form of a three-phase IGBT module. An IGBT (insulated gate bipolar transistor) is understood to mean a four-layer semiconductor component which is controlled by means of a gate. IGBTs are a further development of power MOSFETs. IGBTs have P-N semiconductor transitions on the output side. Thus, an IGBT is a type of combination of a field-effect semiconductor component and a bipolar semiconductor component. IGBTs are used in energy supply technology often in the form of modules with three half-bridges, i.e. six IGBT semiconductor switches. Such modules are therefore obtainable easily and inexpensively. The invention indicates an elegant way of using the six semiconductor switches or three half-bridges provided in a three-phase IGBT module efficiently for the design of a bridge module.

In accordance with an advantageous development of the invention, at least one inductor is connected in series with a bridge module or a series circuit of bridge modules. The inductor brings about, by virtue of its energy storage property, smoothing of the current profile through the bridge module or through the series circuit of bridge modules.

In accordance with an advantageous development of the invention, in a series circuit of bridge modules, a control unit is designed to disconnect a bridge module identified as defective. The disconnection can be performed by bridging the connections of the bridge module via the semiconductor switches thereof. In accordance with an advantageous development of the invention, a control unit is designed to disconnect a battery of a bridge module, which battery is identified as being defective. The disconnection can take place, for example, by the semiconductor switches of the DC voltage converter. The control unit can be a control unit associated with the bridge module, a superordinate control unit for a plurality of bridge modules or a central control unit for the entire cycloconverter.

BRIEF DESCRIPTION OF THE DRAWING

The invention will be explained in more detail below with reference to exemplary embodiments using drawings, in which.

DETAILED DESCRIPTION OF PREFERRED EMBODIMENTS

The same reference symbols are used for mutually corresponding elements in the figures.

Figure 1:
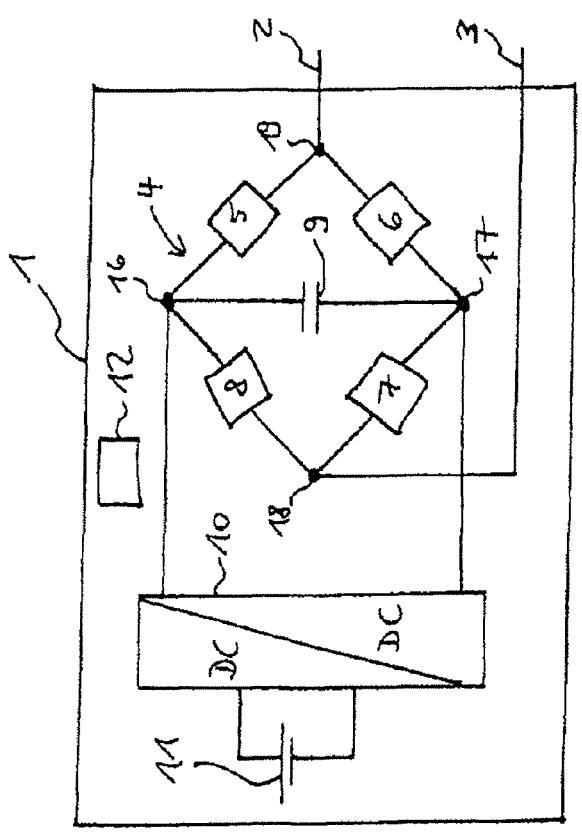
FIG. 1 shows a first embodiment of a bridge module.

FIG. 1 shows a bridge module 1, which is suitable as a device for integrating at least one battery in an energy supply system. The bridge module 1 has, as external connections, a first connection 2 and a second connection 3. The connections 2, 3 are the external connections between the bridge module and an energy supply system, further bridge modules or other components. The bridge module 1 has a full-bridge circuit 4 with four electronic semiconductor switches 5, 6, 7, 8. A bipolar capacitor 9 is connected between two opposite connection points 16, 17 of the full-bridge circuit 4. The remaining two opposite connection points 18, 19 of the full-bridge circuit 4 are connected to the external connections 2, 3. The connection points 16, 17 are connected to a controllable, bidirectional DC voltage converter 10, which is in the form of a combined step-up/step-down converter. The DC voltage converter is connected in parallel with the capacitor 9. A battery 11, which is connected to the DC voltage converter 10, is provided on the opposite connection side of the DC voltage converter 10. The bridge module 1 also has a control unit 12, for example in the form of a microprocessor or a logic circuit. The control unit 12 is connected to control connections of the semiconductor switches 5, 6, 7, 8 and to a control input of the DC voltage converter 10. The control unit 12 implements a control program, with which the operation of the DC voltage converter 10 and the switching states of the semiconductor switches 5, 6, 7, 8 are controlled. If the semiconductor switches 5, 6, 7, 8 are in the form of IGBTs, the gate connections thereof are each connected to the control unit 12.

Figure 2:
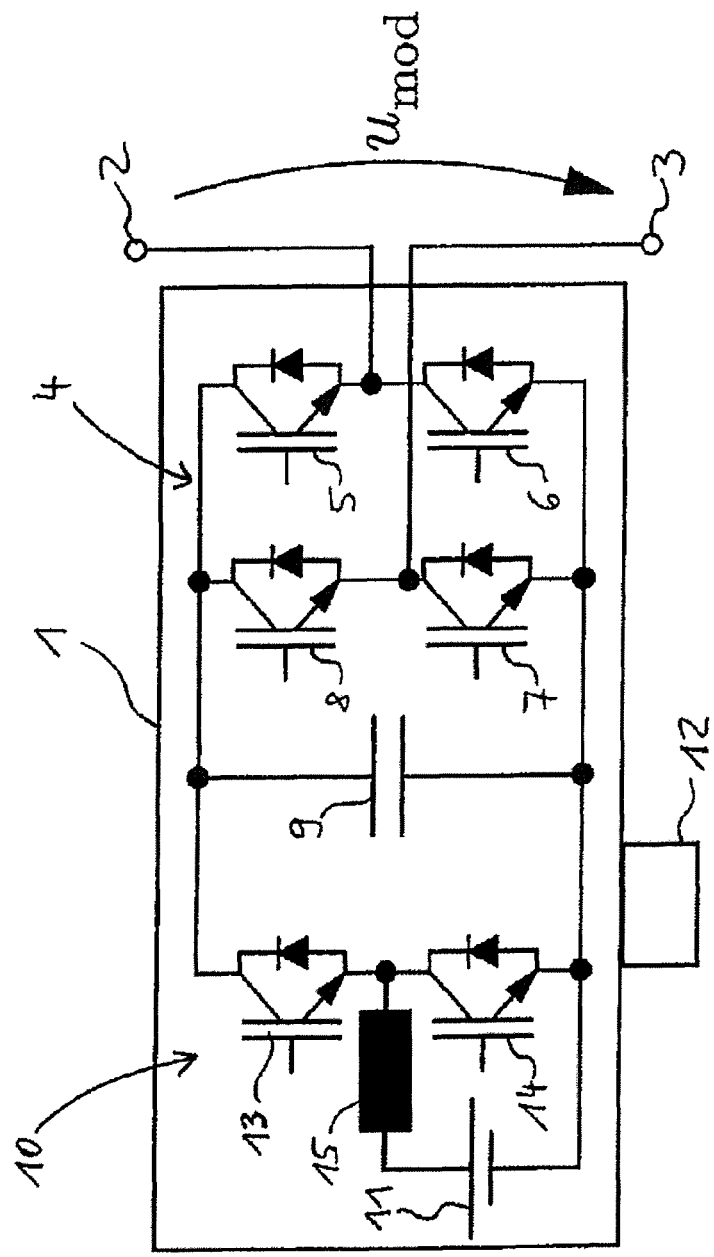
FIG. 2 shows a second embodiment of a bridge module.

FIG. 2 shows a more specific embodiment of a bridge module 1. The semiconductor switches 5, 6, 7, 8 of the full-bridge 4 are each in the form of IGBTs. In addition, the DC voltage converter 10 has two further electronic semiconductor switches 13, 14, which are in the form of IGBTs. The gate connections of the semiconductor switches 13, 14, in the same way as the gate connections of the semiconductor switches 5, 6, 7, 8, are connected to the control unit 12. The control unit 12 hereby implements control of the DC voltage converter 10 by correspondingly driving the semiconductor switches 13, 14. The semiconductor switches 13, 14 are arranged in a half-bridge circuit. In this case, the collector connection of the semiconductor switch 13 is connected to the connection point 16 of the full-bridge circuit 4. The emitter connection of the semiconductor switch 14 is connected to the connection point 17 of the full-bridge circuit 4. The emitter connection of the semiconductor switch is connected to the collector connection of the semiconductor switch 14 and to an inductor 15. The inductor 15 is connected to a connection of the battery 11, for example to the positive terminal. A second connection, for example the negative terminal, of the battery 11 is connected to the emitter connection of the semiconductor switch 14 and therefore to the connection point 17 of the full-bridge circuit 4.

The use of the semiconductor switches 13, 14 and the inductor 15 enables a simple and cost-effective design of a bidirectional, controllable DC voltage converter, which is therefore in the form of a step-up converter. In addition, a three-phase IGBT module can be used, which already has six IGBTs, which are each connected in pairs to form a half-bridge circuit. In this case, a first half-bridge of the IGBT module can be used for the arrangement of the semiconductor switches 5, 6, a second half-bridge for the semiconductor switches 7, 8 and the third half-bridge for the semiconductor switches 13, 14.

Figure 3:
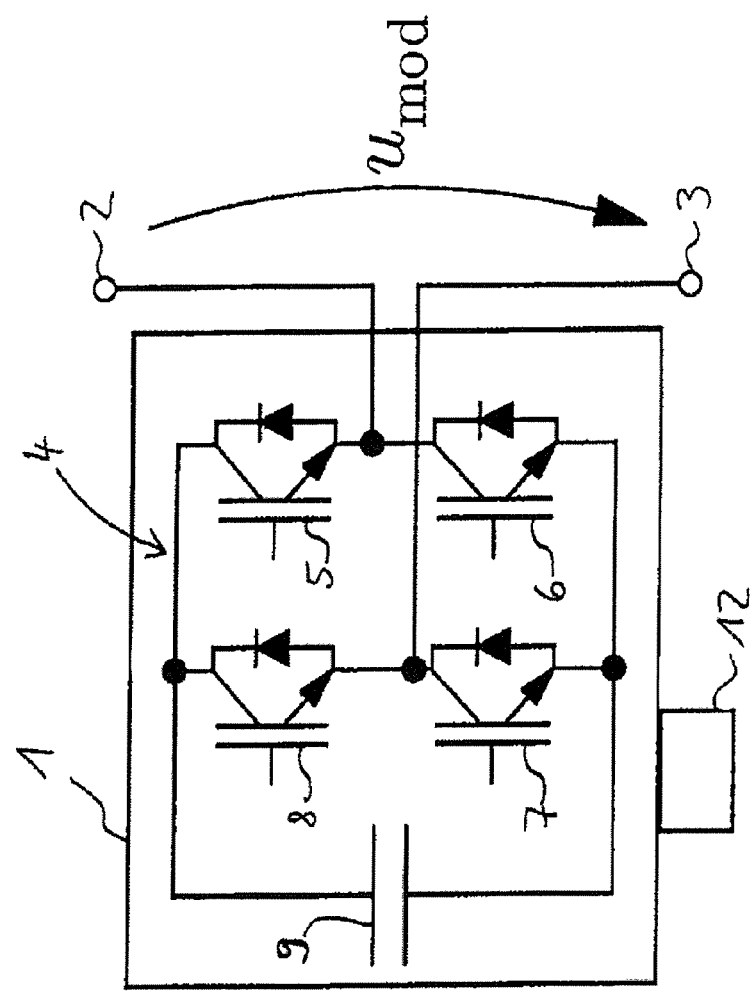
FIG. 3 shows a third embodiment of a bridge module.

FIG. 3 shows a further embodiment of a bridge module 1. The bridge module 1 shown in FIG. 3 has a comparable design to the bridge module 1 shown in FIG. 2, but without the DC voltage converter 10 and the battery 11.

Figure 4:
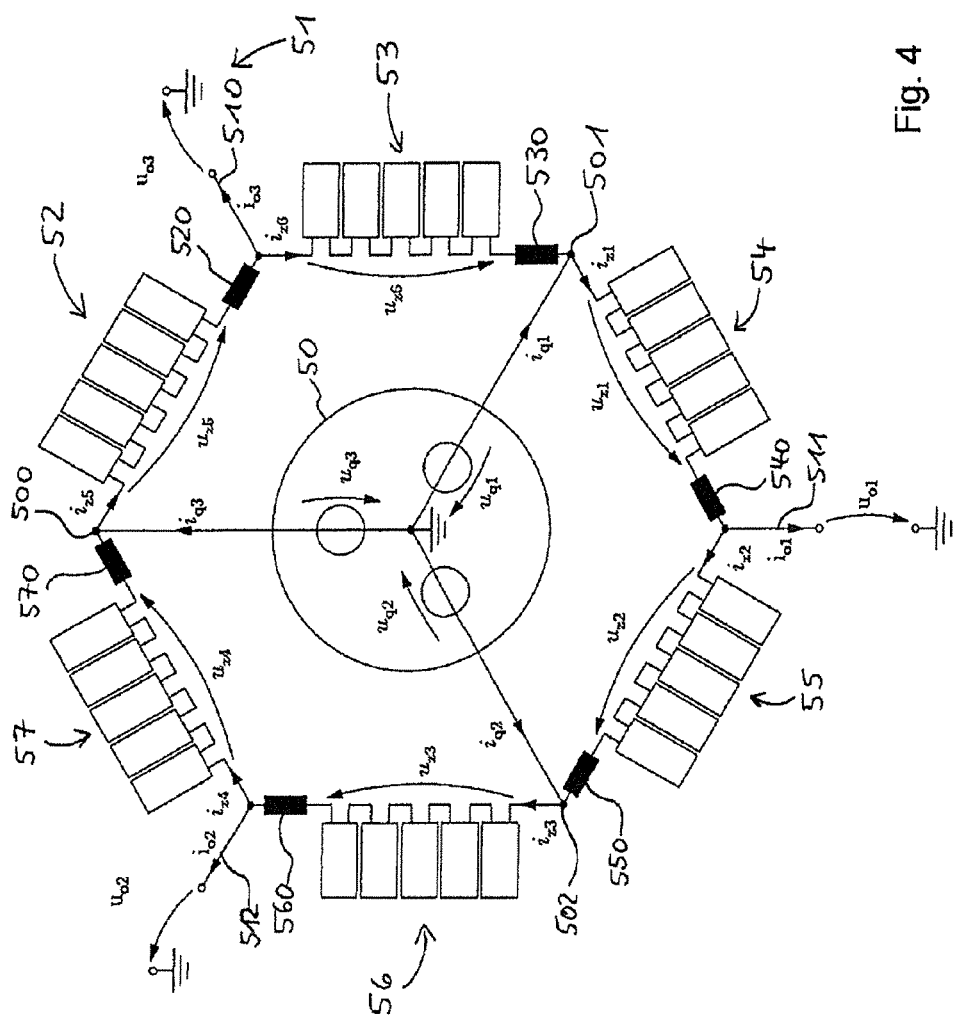
FIG. 4 shows a cycloconverter.

FIG. 4 shows a cycloconverter, with which a first energy supply system 50, which is in the form of a three-phase system, is connected to a second energy supply system 51, which is likewise in the form of a three-phase system. For the connection, in each case series circuits 52, 53, 54, 55, 56, 57 of bridge modules 1 are used, wherein the bridge modules can optionally be formed with or without battery and DC voltage converter. In this case, bridge modules as shown in FIGS. 1 to 3 can be used, even with a mixed configuration. In each case one inductor 520, 530, 540, 550, 560, 570 is arranged in series with the respective series circuit 52, 53, 54, 55, 56, 57. The device has the following design:

A first series circuit 52 of bridge modules 1 is connected firstly to a first conductor 500 of the first power supply system 50 and secondly to a first conductor 510 of the second power supply system 51. A second series circuit 53 of bridge modules 1 is connected firstly to a second conductor 501 of the first power supply system 50 and secondly to the first conductor 510 of the second power supply system 51. A third series circuit 54 of bridge modules 1 is connected firstly to the second conductor 501 of the first power supply system 50 and secondly to a second conductor 511 of the second power supply system 51. A fourth series circuit 55 of bridge modules 1 is connected firstly to a third conductor 502 of the first power supply system 50 and secondly to the second conductor 511 of the second power supply system 51. A fifth series circuit 56 of bridge modules 1 is connected firstly to the third conductor 502 of the first power supply system 50 and secondly to a third conductor 512 of the second power supply system 51. A sixth series circuit 57 of bridge modules 1 is connected firstly to the first conductor 500 of the first power supply system 50 and secondly to the third conductor 512 of the second power supply system 51.

The topology shown in FIG. 4, given corresponding control of battery-equipped bridge modules 1, enables the implementation of interruption-free power supply in the energy supply system. In addition, power factor correction and compensation of fluctuations in the energy demand or, in the case of the use for connection of a generator to an energy supply system, compensation of fluctuations in the provided energy can take place via the bridge modules 1. In order to coordinate the control of the plurality of bridge modules 1, a common control unit can be provided, which is connected to the individual control units 12 of the bridge modules 1 via data communication. The common control unit controls the DC bridge voltages of the individual bridge modules and the output voltages output by the individual bridge modules.

What is claimed is:

1. A transformerless cycloconverter for connecting a first three-phase system to a second three-phase system by means of bridge modules, each having electronic semiconductor switches, the cycloconverter having precisely six bridge modules, each bridge module includes one or a series circuit of bridge modules, said transformerless cycloconverter comprising:
   a) a first bridge module or a first series circuit of bridge modules being connected firstly to a first conductor of the first three-phase system and secondly to a first conductor of the second three-phase system,
   b) a second bridge module or a second series circuit of bridge modules being connected firstly to a second conductor of the first three-phase system and secondly to the first conductor of the second three-phase system,
   c) a third bridge module or a third series circuit of bridge modules being connected firstly to the second conductor of the first three-phase system and secondly to a second conductor of the second three-phase system,
   d) a fourth bridge module or a fourth series circuit of bridge modules being connected firstly to a third conductor of the first three phase system and secondly to the second conductor of the second three-phase system,
   e) a fifth bridge module or a fifth series circuit of bridge modules being connected firstly to the third conductor of the first three-phase system and secondly to a third conductor of the second three-phase system,
   f) a sixth bridge module or a sixth series circuit of bridge modules being connected firstly to the first conductor of the first three-phase system and secondly to the third conductor of the second three-phase system.

2. The cycloconverter as claimed in claim 1, wherein at least one bridge module includes
   a) the bridge module has a first and a second connection for connection to a conductor of the three phase system or to a connection of a further bridge module,
   b) the bridge module has four electronic semiconductor switches in a full-bridge circuit,
   c) the first and the second connections of the bridge module are connected to mutually opposite connection points of the full-bridge circuit,
   d) the bridge module has a capacitor, which is connected to the further mutually opposite connection points of the full-bridge circuit.

3. The cycloconverter as claimed in claim 1, wherein at least one bridge module has the following features: a) the bridge module has a battery, b) the bridge module has a DC voltage converter, wherein one connection side of said DC voltage converter is connected in parallel with the capacitor and the battery is connected to another connection side of said DC voltage converter.

4. The cycloconverter as claimed in claim 3, wherein the DC voltage converter is designed to provide an output voltage at the capacitor which can be adjusted, depending on the control of the DC voltage converter, so as to be higher than, lower than or equal to the voltage of the battery.

5. The cycloconverter as claimed in claim 3, wherein the DC voltage converter is a bidirectional DC voltage converter.

6. The cycloconverter as claimed in claim 3, wherein the DC voltage converter has a half-bridge with two electronic semiconductor switches.

7. The cycloconverter as claimed in claim 6, wherein the electronic semiconductor switches are provided in the form of a three-phase IGBT module.

8. The cycloconverter as claimed in claim 1, wherein at least one inductor is connected in series with a bridge module or a series circuit of bridge modules.

9. The cycloconverter as claimed in claim 1, wherein, in a series circuit of bridge modules, a control unit is designed to disconnect a bridge module identified as defective.

10. The cycloconverter as claimed in claim 3, wherein a control unit is designed to disconnect a battery of a bridge module, which battery is identified as being defective.

* * * * *